Patented July 16, 1946

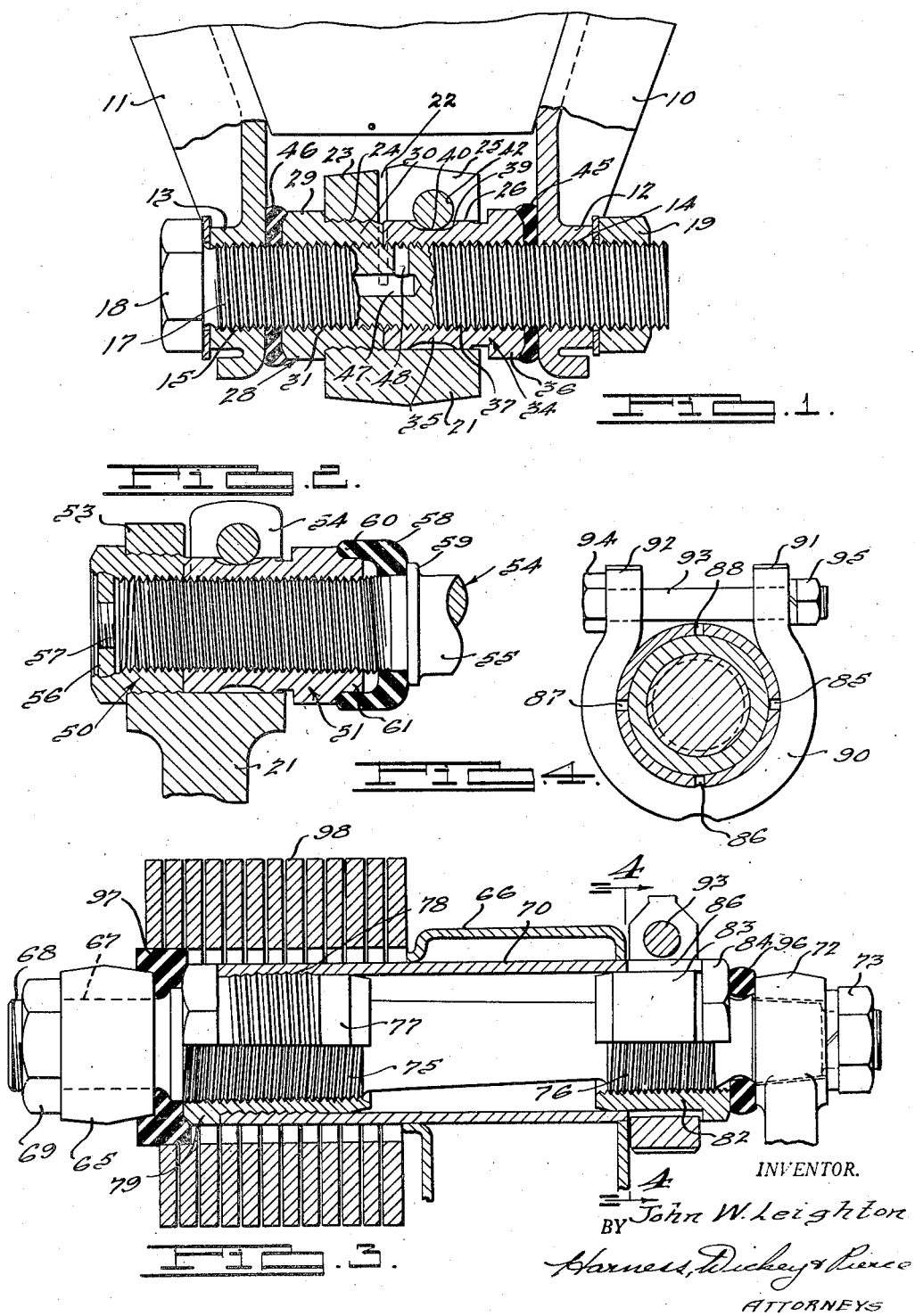

2,404,076

UNITED STATES PATENT OFFICE 2,404,076

ADJUSTABLE THREADED CONNECTION

John W. Leighton, Port Huron, Mich.

Application May 4, 1944, Serial No. 534,020

1 Claim. (Cl. 287—96)

The invention relates to pivotal connections and it has particular relation to pivotal connections for use in automobile wheel suspensions.

In individual suspensions, the wheel is connected to the vehicle frame by means of linkage having arms and accordingly pivotal connections are required at the ends of the arms. It has been general practice in the manufacture of motor vehicles where individual wheel suspensions are used to employ threaded bearings so that the pivotal or oscillatory movements occur on the surface of threads. In most instances, a threaded bushing is employed between the two parts pivotally connected and in certain cases the bushings have been adjustable in order to permit camber or caster variations.

One object of the present invention is to provide an improved pivotal and threaded bearing which permits ready adjustments in order to take up clearances between threads such as may occur on account of wear during use of the bearing.

Another object of the invention is to provide a bearing of this character which may be easily manufactured and assembled so that the cost thereof may be maintained at a minimum.

Another object of the invention is to provide pivotal connections such as indicated which are particularly applicable in connection with substantially spaced threaded bearings as employed in connection with that type of suspension having the linkage directed longitudinally of the vehicle and wherein lateral stability must be obtained at least partly through the substantially long pivotal connection.

Other objects of the invention will become apparent from the following description, from the drawing to which it relates and from the claim hereinafter set forth.

For a better understanding of the invention reference may be had to the accompanying drawing wherein:

Figure 1 is a cross sectional view illustrating a pivotal connection constructed according to one form of the invention and which is employed in connection with two arms or links extending laterally from the vehicle frame;

Figure 2 is a cross sectional view illustrating application of the invention to a pivotal connection between a single arm extending laterally from the vehicle frame and a vertical wheel supporting member;

Figure 3 is a cross sectional view illustrating use of one form of the invention in connection with a link forming part of an individual wheel suspension which extends longitudinally of the vehicle frame;

Figure 4 is a cross sectional view taken substantially along the line 4—4 of Figure 3.

Referring to Figure 1, the construction illustrated includes a pair of links or arms 10 and 11 extending laterally from the vehicle frame and having their inner ends pivotally connected thereto for up and down swinging movement about a horizontal axis extending longitudinally of the frame. These arms respectively at their outer ends have extruded portions 12 and 13 which are provided with threaded openings 14 and 15 located in aligned relation. A threaded pin 17 is threaded through both of the openings 14 and 15 and at one end has a hexagonal head 18 engaging one arm and at its other end a nut 19 engaging the other arm. Lock washers or other suitable locking means may be employed for holding the nut 19 in position and in normal use the pin does not turn but remains fixed to the arms.

A wheel mounting member is indicated at 21 and this member extends vertically between the outer ends of the arms 10 and 11 and another arm or arms also extending laterally from the vehicle frame but disposed in vertically spaced relation to the arms 10 and 11. In this connection, it may be said that the arms 10 and 11 may be at the lower part of the suspension so that they may be connected to the lower part of the mounting member 21, while a single upper arm may be connected to the upper end of the wheel mounting member in the manner presently to be explained in connection with Figure 2.

The upper end of the mounting member 21 has a solid portion 23 provided with an internally threaded opening 24 and a bifurcated portion 25 separated from the upper half of the solid portion by a slot 22 extending half way through the opening has a cylindrical, non-threaded portion 26 aligned with the threaded opening 24. Both of these openings are substantially larger than the threaded pin 17 and the latter projects through them. In order to provide a pivotal connection between the threaded pin and the member 21, a bushing 28 having a head 29 and a body portion 30 is threaded into the opening 24 until the head 29 engages the side of the portion 23 of the member. The threads on the body 30 and in the opening 24 are of shallow, obtuse angle character so that when the bushing is threaded into the opening and the head 29 is drawn up tightly against the mounting member, the thread surfaces on the two parts become locked tightly together through a wedging action. Hence, the bushing 29 is locked rigidly to the wheel mounting member.

Internally, the bushing 29 is provided with normal threads 31 which engage the threads on the pin 17. This threaded engagement permits free relative turning of the bushing and wheel mounting member with respect to the pin 17, or, in other words, the bushing and pin have a threaded bearing engagement.

The bifurcated part 25 of the wheel mounting member receives a bushing 34 having a body portion 35 slidable in the cylindrical opening 26 and a hexagonal head portion 36 which facilitates turning of the bushing when desired. This bushing has internal threads 37 engaging the threads on the pin 17 so as to provide a threaded bearing engagement such as previously mentioned. Externally, the body 35 has an annular groove 39 which has a cylindrical bottom 40. For locking the bushing 34 to the wheel mounting member in any position of adjustment, a clamping bolt 42 is provided and this bolt extends through openings in the ends of the bifurcated portion 25. The bolt may be on the order of that shown by Figure 4 and has a head on one end and a nut on the other so as to draw the two ends of the bifurcated portion together in such manner as to tightly clamp the bifurcated portion about the body portion of the bushing.

The clamping bolt extends through the groove 40 and accordingly when the bolt is in place the bushing can be moved axially only within limits depending upon the axial length of the groove. It follows that the bushing 34 may be adjusted axially within limits when the bolt is loosened and that the bushing cannot be moved beyond certain limits with the bolt in place.

In the event the threaded engagement between the two bushings and the pin becomes undesirably loose owing to wear, or if there is too much clearance at any time such as when the parts are initially assembled, the play can be effectively eliminated by turning the bushing 34 after the bolt 42 has been loosened. When the bushing 34 is in abutment with the end of the bushing 28 any further turning of the bushing 34 relative to the bushing 28 will shift the pin relative to the bushings so that play in the threads can be reduced or eliminated. All of the play might be eliminated in this manner or the play might be partly eliminated as may be found most desirable. After the bushing 34 is adjusted to the desired extent, the bolt 42 is again tightened so as to lock the bushing 34 in place and then both bushings become rigidly held in the openings of the wheel mounting member and turn therewith relative to the pin during operation of the joint.

Sealing members 45 and 46 may be disposed at opposite ends of the pivotal connection between the bushings and the arms respectively so as to prevent dirt or other foreign matter from gaining access to the threaded bearing. At the same time, the sealing elements prevent the escape of lubricant. For lubricating the bearing, the pin may have an axial opening 47 leading to one end and a grease fitting may be placed on such end of the pin as will be readily understood. A radial opening 48 leading from the opening 47 to the external surface of the pin allows the lubricant to flow to the threads.

In the arrangement shown by Figure 2, the wheel mounting member 21 at its upper end has bushings 50 and 51 which correspond to the bushings 28 and 34 except for certain distinctions which will be clear hereafter. Similarly to the structure shown by Figure 1, the upper end of the wheel mounting member has a solid portion 53 and a bifurcated portion 54 cooperating with the bushings in the manner previously stated. Instead of using a pin in this case, the upper arm of the wheel suspension is in the form of a rod 54 extending laterally from the vehicle frame and having an offset or bent portion 55 extending longitudinally of the frame. This longitudinal portion 55 is externally threaded and extends through both of the bushings.

For lubricating the bearing, the end of the bushing 50, has a welch plug 56 therein and this plug has a central threaded opening 57 adapted to receive a grease fitting. Lubricant is prevented from escaping at the end of the other bushing by a resilient sealing ring 58 seated on the end of the trunnion and against a shoulder 59 and which has a rim portion 60 annularly embracing a cylindrical end portion 61 of the bushing.

It might be observed that the position of the lower end of the member 21 may be varied longitudinally of the vehicle by locating it at the desired point between the arms 10 and 11 prior to threading the pin 17 into place and through the threaded openings. Likewise, the position of the upper end of the arm 21 may be shifted along the vehicle by threading the end of the trunnion to a greater or lesser extent through the bushings during initial assembly. Depending on initial play in the threads or clearances, the wheel mounting member 21 might be tilted with respect to the vertical a slight amount for caster adjustment purposes and after positioning the member for this purpose, the bushings 34 and 51 may be tightened against the bushings 28 and 50 so as to remove additional play in the threaded bearings if desired. At any time during use, the threading bearings may be adjusted as previously stated so that the desired play in the bearings can be maintained.

In the arrangement shown by Figure 3, a wheel mounting arm 65 is provided which extends longitudinally of the vehicle frame shown partly at 66. This wheel mounting arm, at its forward end, not shown, is connected to a wheel and normally an upper and a lower arm will be employed. At its rear end the arm 65 has an opening 67 which receives a pin 68 and for holding the arm in position, a nut 69 is threaded on the end of the pin. For locking the arm and pin together, the pin may have a keyway or it may be serrated so that turning of the arm causes turning of the pin.

The pin extends through a sleeve or tubular member 70 fastened on the frame member 66 and beyond the opposite end of the tubular member, a shock absorber arm 72 is secured to the pin by means of a nut 73. Within the tubular member the pin has a larger threaded portion 75 and a smaller threaded portion 76 and these threaded portions are substantially smaller than the tubular member. A bushing 77 is threaded into the outer end of the tubular member 70 and the threaded engagement is of the obtuse angle thread type as indicated at 78. A head 79 on the outer end of the bushing is adapted to abut the end of the tubular member 70 and accordingly when the bushing is tightened so as to draw the head 79 against the end of the tubular member the side surfaces of the threads are tightly locked together so as to hold the bushing in position in the tubular member. Internally, the bushing has threads freely turnable on the threaded portion 75 of the pin.

A similar bushing 82 is disposed in the other end of the tubular member and is threaded on the pin portion 76 but this bushing has a cylindrical outer surface 83. A head 84 on the bushing facilitates turning it. For clamping the bushing 82 in position in the tubular member, the end of the latter has four circumferentially spaced slots 85, 86, 87 and 88 and around this slotted end portion, a clamping member 90, shown best by Figure 4, is provided. This clamping member has a portion projecting into the slot 86 to locate the member circumferentially and also has ends 91 and 92 which are apertured and receive a clamping bolt 93 having a head 94 on one end and a nut 95 on the other. When the bolt is tightened, the segments between the slots are contracted so as to tightly clamp the bushing 82 and lock it positively to the tubular member.

A grease fitting may be applied to the tubular member 70 at any point between the bushings so as to provide lubricant and rubber sealing elements 96 and 97 at opposite ends of the bushings may be provided to prevent the escape of lubricant. A torsion spring 98 is shown also and this is connected at one end to the arm 65 and at its other to the frame.

In assembling the parts, the bushings 79 and 82 may be placed in position in the member 70 and then the pin may be inserted from the outer or left end of the member. The diameter of the threaded portion 76 is such as to allow its passage through the bushing 77 and when the pin has been moved inwardly sufficiently the threads 75 will engage the threads in the bushing 77 and then the pin is advanced by turning it. As soon as the threads 76 on the pin reach the threads in the bushing 82, they will thread into the second bushing providing the threads are properly disposed, but since the bushing 84 is adjustable, it may be moved or adjusted until threaded engagement occurs. After the pin is in place, undesirable play in the threads may be removed by turning the bushing 83 after its head 84 engages the end of the tube and then any further turning of the bushing will require axial shifting of the pin. When the thread engagement has been adjusted to the desired extent, the clamping bolt 93 is tightened so as to lock the bushing 82 in position.

Although more than one form of the invention has been illustrated and described in detail, it will be apparent to those skilled in the art that various modifications may be made without departing from the scope of the appended claim.

What is claimed is:

A pivotal connection comprising a tubular element, a bushing threaded into and fixed in one end portion of the element and being internally threaded, a second internally threaded bushing having an internal diameter smaller than that of the first bushing and being axially slidable in the other end portion of the element, the latter portion being axially slotted, a shaft or trunnion element extending through the tubular element and having larger and smaller threaded portions engaging the threads of the bushings respectively, the smaller portion being bodily movable through the larger bushing opening without threading it therethrough, means for clamping the slotted end of the tubular element about the bushing therein, and a member connected to one end of the shaft so as to turn therewith.

JOHN W. LEIGHTON.